March 24, 1959 — J. C. WORST — 2,878,914
SPRING CLUTCH MECHANISM
Filed June 20, 1957
2 Sheets-Sheet 1

INVENTOR.
JOSEPH C. WORST
BY
HIS ATTORNEY

March 24, 1959     J. C. WORST     2,878,914
SPRING CLUTCH MECHANISM
Filed June 20, 1957     2 Sheets-Sheet 2
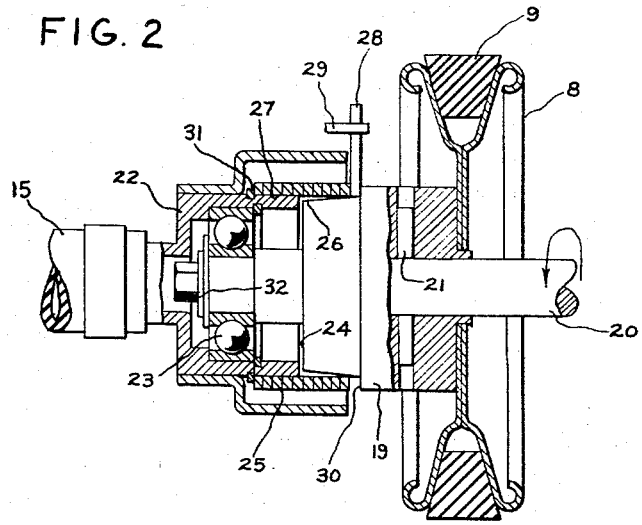
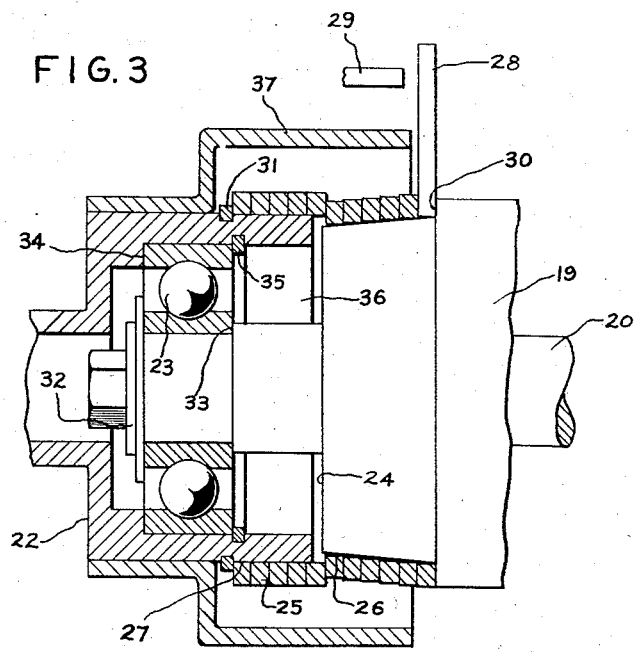
INVENTOR.
JOSEPH C. WORST

United States Patent Office 2,878,914
Patented Mar. 24, 1959

2,878,914

SPRING CLUTCH MECHANISM

Joseph C. Worst, Louisville, Ky., assignor to General Electric Company, a corporation of New York Application June 20, 1957, Serial No. 666,906

3 Claims. (Cl. 192—81)

My invention relates to spring clutch mechanisms and more particularly to such mechanisms for selectively coupling a driven shaft to a continuously rotating drive shaft.

The clutching action in spring clutch mechanisms is provided by means of a helically wound spring which is disposed around coaxial driving and driven drums. In the conventional spring clutch for coupling a driven shaft to a continuously rotating drive shaft, the clutch spring is so wound that it is normally tightened onto both drums by the rotation of the driving drum and thereby couples them securely together. In order to disengage the clutch, that is, in order to prevent the clutch spring from coupling together the two drums, a tab is provided on the end of the spring which is associated with the driving drum, and a movable control member is arranged for engaging this tab so as to hold it stationary. When the tab is engaged by the control member, the spring is prevented from tightening onto the drums as a result of the rotation of the driving drum, and thereby the driven shaft is not coupled to the drive shaft.

Spring clutches of this type, however, have a serious drawback in that a noticeable oscillation of the driven member is created when the clutch is disengaged, particularly when the clutch is connected to a low inertia load. As I understand it, this oscillation is created in the following manner: As the driving member rotates with the clutch spring being prevented from tightening by the control member, some minor torque is nonetheless transmitted to the driven drum, this torque being transmitted partially by the bearing between the two drums and perhaps some also through the clutch spring itself as the driving drum slips under it. As a result of this minute torque the driven drum moves ahead very slightly and the clutch spring unwinds a little bit with it. This very small movement of the driven drum continues until a point is reached where a return force is created in the spring, due to its unwinding from its normal unstressed condition, which is greater than that applied to it by the driven drum. The spring then winds back in the reverse direction carrying the driven drum with it, and in this process it tightens down somewhat on both the driven and the driving drums. As a result of this tightening down, the spring engages the driving drum rather firmly with its middle coils or turns, and the drum thereby applies an impulse to the spring causing it to wind back in the other direction again. And as it winds back or loosens, the spring again moves the driven drum with it. In this loosening, the spring passes back past its normal position so that once more a tightening force is created in it. The spring then tightens down and receives another impulse from the driving hub. As a result an oscillation of the spring is created, and since the driven drum is carried along with the spring as it winds in the opposite directions, it too is set in oscillation.

In some applications this oscillation of the driven drum is very objectionable. For example, in laundry machines spring clutches are often used to drive the drain pump from the main drive motor of the machine, the clutch being disengaged to deactivate the drain pump during the washing operation and being engaged to activate the pump during the drain operation. If the driven member and thus the pump is oscillated during the washing operation, a very noticeable noise condition is created which is very disturbing to the housewife. Thus particularly in this application, although it is certainly true in others, it would be very desirable if the oscillation of the driven drum of the clutch were not created during the periods when the clutch is disengaged.

It is therefore an object of my invention to provide a new and improved spring clutch mechanism in which no noticeable oscillation of the driven drum is created while the clutch is disengaged.

Another object of my invention is to provide such a clutch which may be advantageously used in a washing machine to couple the drain pump to a continuously rotating drive shaft.

In carrying out my invention I provide a spring clutch including coaxial driving and driven members or drums. These members each include an external clutching surface, and a helical clutch spring is disposed around the surfaces for normally clutching together the members upon the rotation of the driving member. To provide for disengaging the clutch, means are incorporated within the clutch for selectively holding stationary the end of the spring associated with the driving member. This holding action prevents the spring from tightening onto the clutching surfaces and thereby maintains the clutch disengaged. The clutching surface of the driving member is cylindrical in form, but by my invention and in order to prevent oscillation of the driven member when the clutch is disengaged, the clutching surface of the driving member is non-uniform in shape being tapered in the direction of the driven member. Specifically, the taper is such that the portion of this surface adjacent the driven member is smaller in diameter than the cylindrical clutching surface of the driven member. As a result of this taper the middle turns or coils of the clutch spring are unable to engage with the portion of the driving surface adjacent the driven member when the end of the spring is held for disengaging the clutch; this is so even if the spring does tighten slightly past its normal position as a result of some minute torque being transmitted to the driven member through the bearings or the spring. With the middle turns of the spring being unable to tighten onto the driving member, no impulse of force is transmitted to the spring and thereby no objectionable oscillation of the driven member is created. It will be understood though that when the spring is released for coupling together the driving and driven members, it will then tighten down freely upon the entire length of the tapered driving surface for coupling it securely to the driven member.

The subject matter which I regard as my invention is particularly pointed out and distinctly claimed in the concluding portion of this specification. My invention, however, both as to organization and method of operation, together with further objects and advantages thereof, may best be understood by reference to the following description taken in conjunction with the accompanying drawings in which:

Fig. 2 is a vertical sectional view of the spring clutch, with clutch being shown in its disengaged condition; and Fig. 3 is an enlarged view generally similar to Fig. 2 but showing the clutch in its engaged or driving condition.

Figure 1:
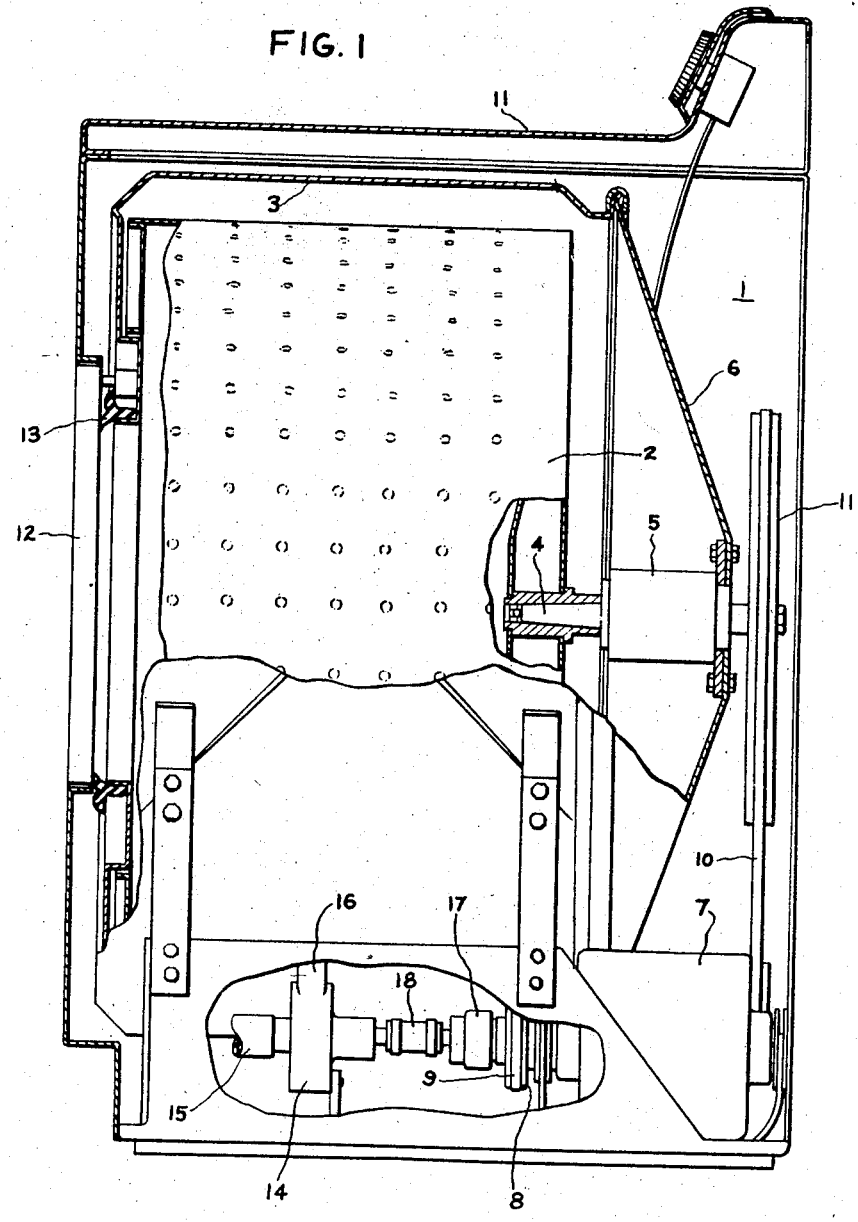
Fig. 1 is a side elevational view of a clothes washing machine including an improved spring clutch embodying my invention, the side panel of the machine being removed and the view being partially broken away and sectionalized to show details.

Referring now to Fig 1 I have shown therein a horizontal axis clothes washing machine 1. The machine 1 includes a clothes basket or drum 2 which is disposed within an outer imperforate tub 3. The basket 2 is both supported and rotated by means of a shaft 4 which is journaled within an elongated bearing 5 hung from the rear wall 6 of the tub structure. The shaft 4 and thus the basket are driven from a drive motor 7 by means of a suitable drive system including a two speed transmission (not shown). The transmission is driven from the motor by means of a pulley 8 and a belt 9, and it in turn drives the shaft through a belt 10 and a pulley 11, the pulley 11 being mounted directly on the shaft 4. The transmission is so arranged that the basket may be driven at a low speed for washing clothes and at a high speed for centrifugally extracting the water from the clothes.

The outer imperforate tub 3 is itself surrounded by an appearance cabinet 11 and suitable openings are provided in the front walls of the appearance cabinet, the tub and the basket to provide for the loading and unloading of the clothes from the machine. As shown, a door 12 is mounted on the appearance cabinet for closing the opening in that structure during the operation of the machine. In addition to closing the cabinet opening the door 12 also closes against a gasket 13 mounted around the tub opening so that it seals off the tub during the machine operation.

In order to drain the tub 3 at the close of the washing operation and also throughout the centrifugal extraction operation, the machine 1 is provided with a centrifugal drain pump 14. This pump when in operation withdraws water from the tub through a conduit 15 and discharges it to a household drain through its outlet 16. The pump is driven from the main drive motor 7 through a spring clutch mechanism 17 which embodies my invention in one preferred form thereof. The input member of the clutch 17 is connected directly to the drive shaft of the motor and the output member of the clutch drives the pump through a flexible connection 18. The clutch is so constructed and arranged that it provides a positive drive for the pump when it is engaged but yet does not cause any noticeable oscillation of the pump when it is disengaged. By this elimination of oscillation of the pump when the clutch is disengaged, the clutch noticeably reduces the noise produced by the machine, which is, of course, very advantageous.

Referring now to Figs. 2 and 3 I have shown therein a preferred embodiment of my new and improved spring clutch mechanism. As there shown, the clutch includes a driving member or drum 19 which is secured to the main drive shaft 20 of the motor 7 by means of a force fit pin 21, and a driven member or drum 22 which is coaxial with the motor shaft but yet is rotatably mounted thereon. Specifically the driven member 22 is mounted on the motor shaft by means of a ball bearing assembly 23. The driven member, it will be noted, is spaced slightly from the driving member 19 with a space 24, hereinafter referred to as the cross over gap, appearing between them.

In order to provide a drive between the driving member 19 and the driven member 22 there is provided a helically wound clutch spring 25 which is disposed around drum surfaces 26 and 27 formed on the driving and driven members respectively. As will now be explained, the configuration of these external drum or clutching surfaces 26 and 27 forms a very important aspect of my invention. The clutching surface 27 on the driven member or drum 22 is generally cylindrical in configuration. That is, it is uniform in diameter from one end to the other. The clutching surface 26 on the driving member, or drum, however, is not uniform in diameter but rather is smaller at its end adjacent the surface 27 than it is at its other end. Specifically, it is tapered in the direction toward the driven member so that adjacent the cross over gap 24 it is smaller in diameter than the clutching surface 27. In my preferred embodiment the surface 26 is of the same diameter as the surface 27 at its remote end and is tapered uniformly so that it is generally frusto-conical in shape. As will be explained hereinafter, this taper of the driving surface 26 is effective to prevent oscillation of the driven member 22 when the clutch is disengaged.

The motor shaft 20 and thus the driven member 19 rotate continuously during the operation of the washing machine 1. And in order to provide for disengaging the spring clutch 17 during the washing operation so as to deactivate the drain pump 14, an outwardly projecting tab 28 is provided at the one end of the clutch spring 25. Specifically, it is provided at the end of the spring associated with the driving member, i.e., the right hand end of the spring as viewed in Figs. 2 and 3. To disengage the clutch a control member or arm 29 is moved into the rotational path of this tab so as to prevent the right hand end of the spring from rotating. The control arm 29 may be operated by any suitable means as, for example, a solenoid (not shown). When the control arm 29 is engaged with the tab 28 as the shaft rotates in the direction indicated by the arrow, it results in about the first half turn or coil of the spring 25 raising very slightly off the clutching surface 26 of the driving member 19. As a result the spring does not wind down onto the surfaces 26 and 27 but rather remains in the position illustrated in Fig. 2 wherein it does not couple the surfaces together. In other words with the tab 28 engaged by the control arm 29, the spring does not tighten onto the surfaces 26 and 27 so as to drive the driven drum 22.

When the control arm 29 is retracted out of the path of the tab 28, then, however, the clutch spring couples the driving and driven members securely together. This driving connection is clearly shown in Fig. 3. As is there shown, when the spring is free to rotate, it winds or tightens down on the tapered surface 26 and also on the cylindrical surface 27 and thereby couples the driving and driven members 19 and 22 together. The taper of the driving clutch surface 26 does not interfere with this coupling action in any way but rather when the clutch spring engages it firmly to drive the driven member.

But as a result of the taper of the clutching surface 26 no oscillation of the driven member is set up during the periods when the clutch is disengaged; that is, no oscillation of the driven member is set up when the tab 28 is engaged by the control member 29. Even during the disengaged condition of the clutch some minor torque will, of course, be transmitted to the driven member 22 through the ball bearing assembly 23 and some perhaps through the clutch spring itself as the surface 26 rotates under it. This minor torque, as in a conventional clutch, tends to cause the driven member 22 to move ahead slightly unwinding the spring 25, and the unwinding continues until a sufficient return force is created in the spring to cause it to tighten. But, in accordance with my invention, as the spring tightens, i.e., winds back, its middle turns or coils adjacent the cross over gap 24 cannot tighten down onto the clutching surface 26. Rather the clearance between the spring and the inner diameter of the middle turns is such that even though the spring tightens slightly past its normal position, nonetheless the clutch surface 26 is not engaged by the spring. As a result no impulse of driving force is transmitted to the spring to cause it to apply a minute torque to the driven clutching surface 27. And thus no noticeable oscillation of the driven member 22 is set up during the disengaged condition of the clutch. Reiterating, since the middle turns of the spring 25 do not tighten down onto the reduced diameter portion of the clutching surface 26 adjacent the cross over gap 24 as the spring rewinds slightly past its normal position, the new force necessary to a sustained oscillation is not applied to the spring and thus no objectional oscillation of the driven member 22 is created.

As was mentioned above, in the illustrated embodiment the end of the tapered clutching surface 26 remote from the cross over gap 24 is of the same diameter as the cylindrical clutching surface 27 of the driven member. For example, in a size of this clutch which has been found suitable for use in the pump drive of automatic washing machines, the external diameter of the driven clutch surface 27 is approximately 1.49 inches in diameter and so also is the maximum diameter of the tapered surface 26. In this same clutch the minimum diameter of the tapered surface 26 adjacent the cross over gap 24 is approximately 1.44 inches. This is, of course, not quite as great a taper as is shown in the drawings wherein the taper has been slightly exaggerated for purposes of illustration. To continue with the dimensions of this clutch for washing machines, the length of the clutching surface 26 from the shoulder 30 at its outer end to the cross over gap 24 is 0.45 inch, and the length of the driven surface 27 from the cross over gap to the edge of the spring retaining ring 31 at its other end is approximately 0.27 inch. The clutch spring has a normal inner diameter of 1.47 inches and the dimensions of the spring stock are 0.075 inch in height and .060 inch in width. Of course, it will be understood that these dimensions are given only to illustrate one particular arrangement of my new and improved clutch mechanism, and that my invention is in no way limited to a clutch having these dimensions.

With regard to the manner in which the illustrated clutch mechanism is assembled and held together, it will be noted that the inner race of the ball bearing assembly 23 is held on the end of the driving member 19 by means of a bolt and washer assembly 32. Specifically the inner race of the bearing assembly fits between the washer assembly 32 and a shoulder 33 on the member 19. The outer race of the bearing assembly is held between an internal shoulder 34 of the driven member 22 and a snap ring 35 fitted in a groove in the driven member. The clutch spring 25, as shown, is disposed between the shoulder 30 on the driven member and the external snap ring 31 of the driven member with no other retaining means being required for it. The clutch may be lubricated in any suitable manner as by packing grease into the space 36 between the ball bearing assembly 23 and the cross over gap 24, and a suitable housing 37 is mounted on the driven member 22 to prevent the escape of any of this grease during the clutch rotation.

While in accordance with the patent statutes I have described what at present is to be considered the preferred embodiment of my invention it will be obvious to those skilled in the art that various changes and modifications may be made therein without departing from the invention and it is therefore aimed in the appended claims to cover all such equivalent variations as fall within the true spirit and scope of the invention.

What I claim as new and desire to secure by Letters Patent of the United States is:

1. A spring clutch comprising a rotatable driven member having an external cylindrical clutching surface, a rotatable driving member coaxial with said driven member and having an external clutching surface tapered in the direction of said driven member, the portion of said tapered clutching surface of said driving member adjacent said driven member being smaller in diameter than said cylindrical surface of said driven member, the portion of said tapered clutching surface of said driving member remote from said driven member being at least equal in diameter to said cylindrical surface of said driven member, a helical clutch spring disposed around said clutching surfaces for clutching together said members upon the rotation of said driving member, and means for selectively preventing said spring from tightening onto said surfaces during the rotation of said driving member, thereby to maintain said clutch disengaged, said means including a tab formed on the end of said spring associated with said driving member and a control member for engaging said tab to prevent the rotation thereof, the taper of said clutching surface of said driving member being effective to prevent engagement of the middle turns of said spring with the portion of said surface adjacent said driven member when said tab is engaged by said control member, whereby no objectionable oscillation of said driven member is created while said clutch is disengaged.

2. A spring clutch comprising a rotatable driven member having an external cylindrical clutching surface, a rotatable driving member coaxial with said driven member and having an external frusto-conical clutching surface tapered in the direction of said driven member, the portion of said frusto-conical surface adjacent said driven member being smaller in diameter than said cylindrical surface of said driven member, and the end of said frusto-conical surface remote from said driven member being substantially the same in diameter as said cylindrical surface, a helical clutch spring disposed around said clutching surfaces for clutching together said members upon the rotation of said driving member, said spring normally engaging said remote end of said frusto-conical surface and being spaced from said portion of said surface adjacent driven member when said driving member is at rest, and said spring normally tightening upon the entire lengths of said frusto-conical surface and said cylindrical surface upon the rotation of said driving member, thereby to couple together said members, and means for selectively preventing said spring from tightening on the said surfaces during the rotation of said driving member thereby to maintain said clutch disengaged, said means including a tab formed on the end of said spring associated with said driving member and a control arm for engaging said tab to prevent the rotation thereof, said taper of said frusto-conical surface of said driving member being effective to prevent engagement of the middle coils of said spring with the portion of said frusto-conical surface adjacent said driven member when said tab is engaged by said control arm, whereby no objectionable oscillation of said driven member is created while said clutch is disengaged.

3. A spring clutch comprising a rotatable driven member having an external cylindrical clutching surface, a rotatable driving member coaxial with said driven member and having an external clutching surface reduced in diameter in the direction of said driven member, a portion of said clutching surface of said driving member adjacent said driven member being smaller in diameter than said cylindrical surface of said driven member, a portion of said clutching surface of said driving member remote from said driven member being at least equal in diameter to said cylindrical surface of said driven member, a helical clutch spring disposed around said clutching surfaces for normally clutching together said members upon the rotation of said driving member, and control means arranged for selectively holding stationary the end of said spring associated with said driving member thereby to prevent said spring from tightening onto said surfaces during the rotation of said driving member, the reduced diameter of said clutching surface of said driving member adjacent said driven member being effective to prevent engagement of the middle coils of said spring with said surface when said control means are holding said end of said spring stationary, whereby no objectionable oscillation of said driven member is created while said clutch is disengaged.

(References on following page)

References Cited in the file of this patent

UNITED STATES PATENTS

| | | |
|---|---|---|
| 1,300,398 | Jaeger | Apr. 15, 1919 |
| 1,456,493 | Brockway | May 22, 1923 |
| 2,257,987 | Starkey | Oct. 7, 1941 |
| 2,523,772 | McGibbon et al. | Sept. 26, 1950 |
| 2,551,739 | Harlan | May 8, 1951 |
| 2,633,953 | Gorske | Apr. 7, 1953 |
| 2,643,749 | Greenlee | June 30, 1953 |
| 2,705,065 | Kloss | Mar. 29, 1955 |
| 2,738,863 | Stelljes | Mar. 20, 1956 |